Jan. 27, 1948.        F. W. HILD        2,435,041
REGULATING DEVICE FOR COOLING SYSTEMS
Filed Feb. 10, 1945        4 Sheets-Sheet 1
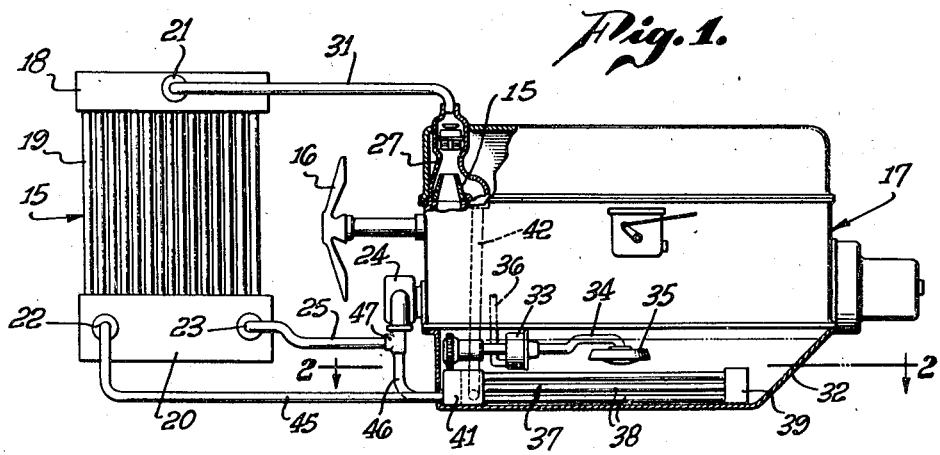
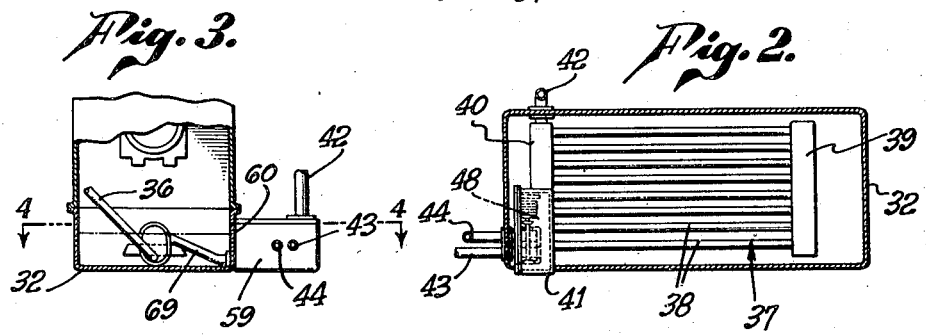
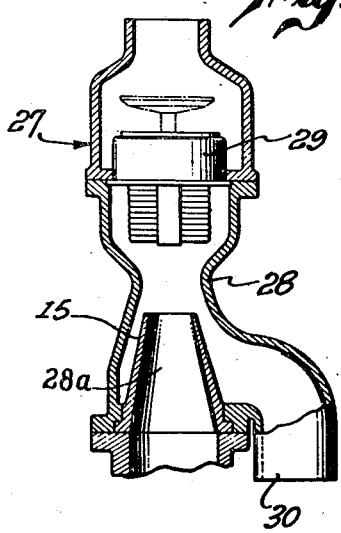
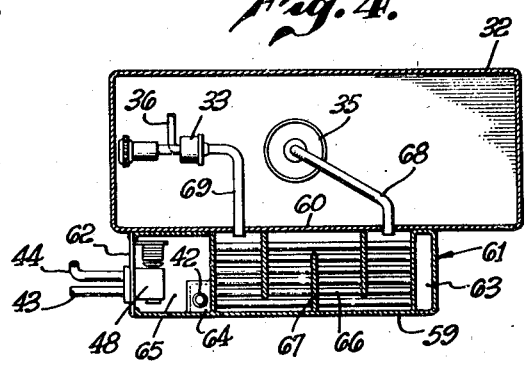
FREDERIC W. HILD,
INVENTOR.
BY John Flam
ATTORNEY.

Jan. 27, 1948. F. W. HILD 2,435,041
REGULATING DEVICE FOR COOLING SYSTEMS
Filed Feb. 10, 1945 4 Sheets-Sheet 2

FREDERIC W. HILD,
INVENTOR.

BY John Flam
ATTORNEY.

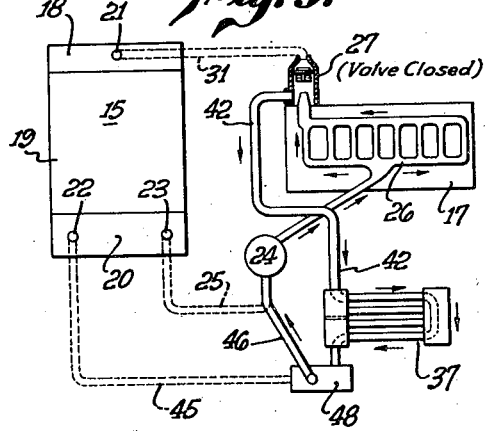
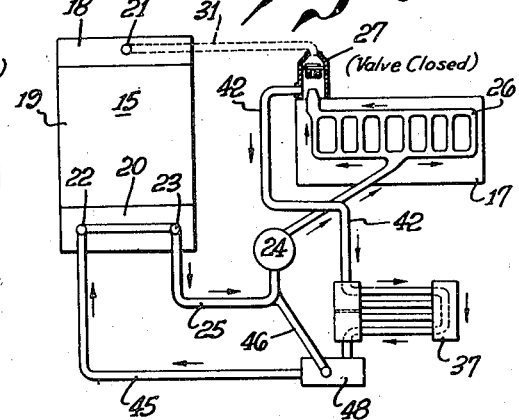
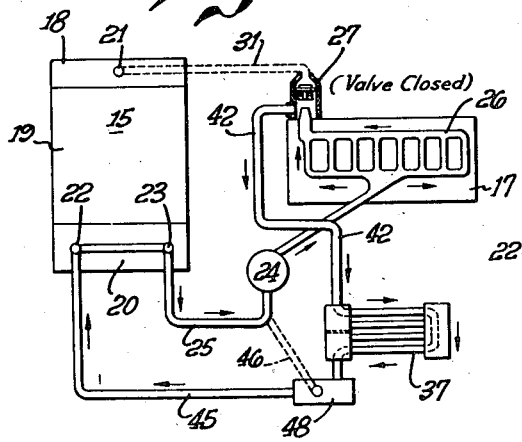
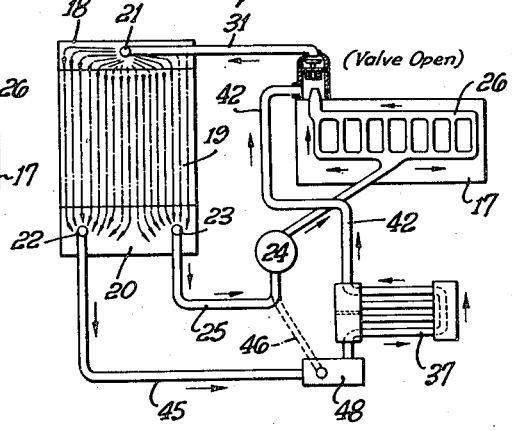
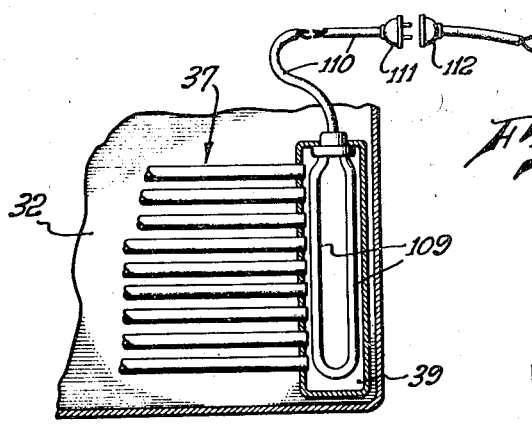

Jan. 27, 1948.  F. W. HILD  2,435,041
REGULATING DEVICE FOR COOLING SYSTEMS
Filed Feb. 10, 1945  4 Sheets-Sheet 4
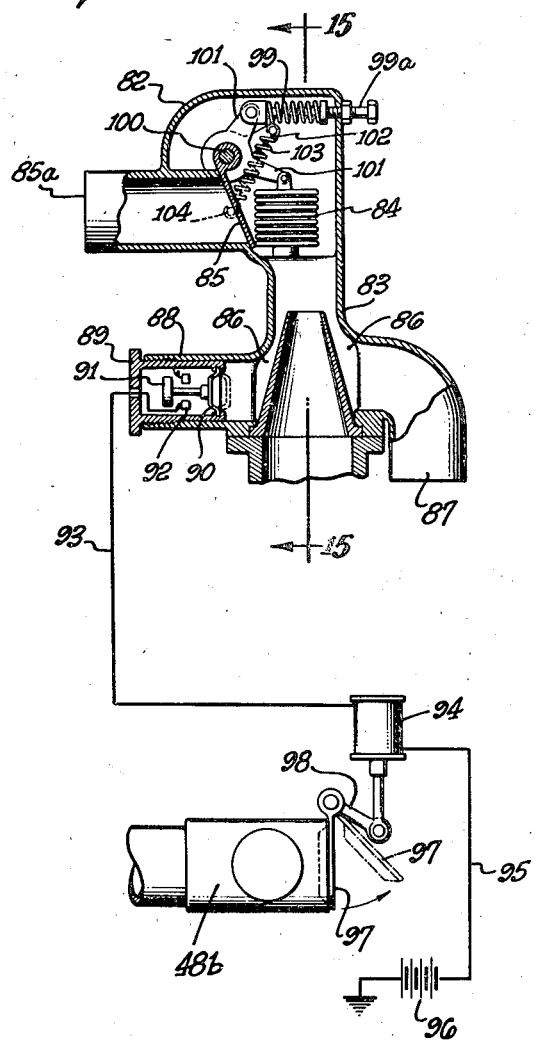
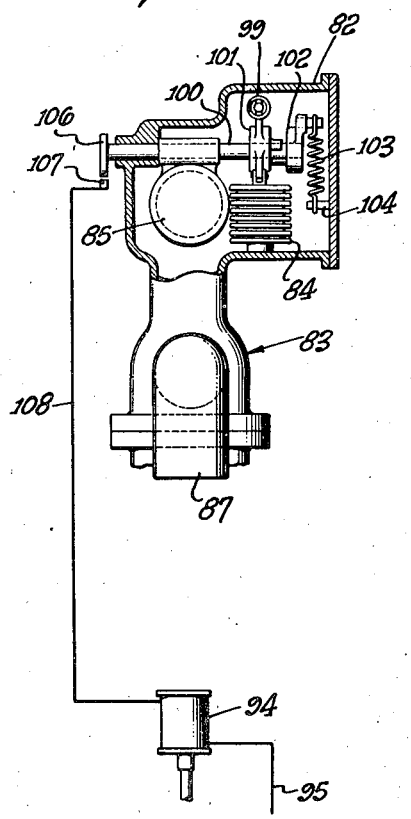
FREDERIC W. HILD,
INVENTOR.
BY John Flam
ATTORNEY.

Patented Jan. 27, 1948

2,435,041

UNITED STATES PATENT OFFICE 2,435,041

REGULATING DEVICE FOR COOLING SYSTEMS

Frederic W. Hild, Los Angeles, Calif.

Application February 10, 1945, Serial No. 577,302

26 Claims. (Cl. 123—178)

This invention relates to a system of temperature control for maintaining substantially constant and predetermined temperature of a liquid in a vessel or container which is subjected to variable and to fluctuating heat from a source of such heat.

As an example in which this invention may be embodied, such a system may be utilized for maintaining the cylinders of an internal combustion engine at or near a desired optimum operating temperature and, as an ancillary purpose, for accelerating the period required to warm up the cylinders and other parts of the engine from a cold start.

In engine operation with moderately varying loads, including infrequent brief idling periods, the heat absorbed by the cylinders and jackets from the fuel combustion is variable in character and degree. For such service, the present invention operates to maintain the liquid circulating through the cylinder jackets at substantially constant temperature. In service involving widely fluctuating loads, such as intermittent running with frequent stops with or without idling, the heat absorbed by the cylinder jackets from the fuel combustion will be correspondingly fluctuating in character and degree. For such service, the invention will maintain the jacket water temperature to predetermined maximums for longer periods and with less falling off in temperature than with the conventional cooling systems.

The process of warming up the engine cylinders should be supplemented by ensuring that the lubricating oil supplied to the engine be very rapidly or preliminarily heated to adequate fluidity; otherwise the bearing surfaces of the engine may be damaged and adversely affect the operation and the upkeep. After the warming up period, it may be necessary to reverse the direction of heat transfer by cooling the cylinders as well as the lubricating oil. For this purpose it has been common to use a cooling radiator through which the liquid to be cooled is caused to circulate.

Radiating means utilized for this purpose usually include a cooling core having a receiving chamber or tank, and also a reservoir tank. The reservoir tank may be connected to the cooling core in any convenient manner. Hot water (as from the outlet of the water jackets) may be passed to the receiving chamber, cooled in the core, and the cooled water deposited in the reservoir tank.

In a prior patent issued to Frederic W. Hild on May 26, 1936, and bearing No. 2,041,928, for "Multiflow cooling system," a scheme is described for effectively utilizing the radiator in conjunction with the water circulating through the cylinder jackets. In that system, the circulation of water through the radiator is at least partly manually controlled, and is so arranged that the cooling effect of the radiator, or of the water therein, may be utilized at will.

It is one of the objects of this invention to improve in general the system described in said patent.

The conventional cooling system requires the water in the radiator, as well as that in the cylinder block, to be heated before the engine can attain proper normal operating temperature. In order to accelerate heating the water in the cylinder block, a thermostat valve is commonly used to by-pass the entire radiator.

Thus, the water in the radiator in this prior conventional system remains cold while the cylinder jacket water heats. When the thermostat valve opens, the heated water is discharged into the radiator, mixing with the cold water therein, and is subjected to forced cooling. Meanwhile, cold water is being pumped into and through the hot cylinder jackets and acts to chill them until the water in the radiator heats. But during the cold conditions, the desired hot temperature of the radiator water is difficult and, sometimes, impossible of attainment.

Under this prior method, the specified quantity of cooling water may not be materially increased or decreased without adversely affecting the engine and its operation. If the specified quantity be diminished, then the engine will run too hot; if the quantity be increased, the engine will run too cold.

The requirement to heat the radiator water and then dissipate and waste much of that heat by forced radiation represents, when integrated, substantial loss of energy, reduction of power plant efficiency and waste of fuel.

By the aid of the present invention, the radiator is utilized as a cold water reservoir, automatically called upon to supply cooling medium, as needed, to reduce excess heat from the liquid circulating through the cooling chambers of the engine.

The principle of holding the reservoir supply of coolant to around atmospheric temperature permits utilizing an unlimited, large quantity of cooling liquid for the internal combustion engine. Thus, for an industrial installation, a tank containing running water as from a lake, a stream, or city water mains, will serve adequately in lieu of the conventional radiator, the invention functioning to cause small quantities of this cold water to flow intermittently, as needed, and to mingle with the hot water circulating in the engine cooling channels so as to maintain substantially constant predetermined or optimum hot temperature of the engine cylinders for the varying loads.

In order to control and regulate the temperature and, thereby, the viscosity and fluidity of the lubricating oil, this invention contemplates the use of a heat exchanger through which the hot liquid from the cylinder jackets may pass for heating the lubricant; and, when the engine cylinders attain a predetermined high temperature, cooling liquid is automatically passed through the heat exchanger to cool the lubricant.

It is accordingly another object of this invention to make it possible automatically to control the direction of heat transfer by the heat exchanger that is in thermal transfer relation to the lubricant reservoir or oil pan.

It is still another object of this invention to make it possible to control the recurring heating and cooling of the cylinders and of the lubricant so that speedy and effective transitions from heating to cooling, and vice versa, are effected automatically; and the intensity of cooling is also automatically controlled, thereby to maintain optimum engine temperatures during the various loads.

It is still another object of this invention to provide a novel form of regulating valve that is thermally responsive, and also responsive to the direction and the pressure of the circulating liquid, for accomplishing these results.

In general terms, the invention employs two liquid flow control devices, the operation and functioning of which are, to a large extent, mutually dependent one upon another. They are linked by one or more streams of liquid flowing under pressure, streams which may have different temperatures or viscosities; each control device of itself may cause a single stream to divide into a plurality of streams, and to direct each stream into different channels; each device may cause a mingling of several streams of different temperatures or different viscosities into one stream; each device is responsive thermally to the streams passing through it, and one of the devices is additionally responsive to the direction of flow and the pressure of the streams passing through it. One of the devices controls the flow direction of one of the streams and may cause the stream to flow either in forward or reverse direction. A heat exchanger in one of the streams may be placed in thermal association with another liquid; and the last mentioned device may change the direction of heat transfer from one liquid to the other, or vice versa. All this is accomplished automatically, without any manipulation or manual control.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 shows, in elevation and in part section, the apparatus embodying the invention;

Fig. 2 is a plan view, taken on the line 2—2 of Fig. 1, showing the heat exchanger and regulating valve combined as a unit disposed in the oil reservoir or oil pan of the engine;

Fig. 3 is an end view, in part section, showing the vacuum type heat exchanger combined with the regulating valve;

Fig. 4 is a plan view in part section, taken on line 4—4 of Fig. 3;

Fig. 5 shows, in part vertical section, the combined jet pump and thermostat valve which comprise the top flow control;

Figure 13:
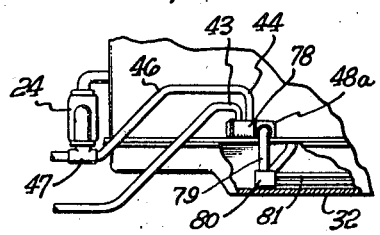

Figs. 9, 10, 11, and 12 are diagrams showing the water circulation of the system in the successive steps of the temperature control;

Fig. 13 is a fragmentary view, showing the regulating valve mounted outside of the crankcase and oil pan of the engine;

Fig. 14 shows, in vertical section, the improved top flow control arranged for operating the by-pass valve member of the regulating valve by pressure-vacuum-electric means;

Fig. 15 is a section on the line 15—15 of Fig. 14, showing another arrangement for operating the by-pass valve member; and Fig. 16 is a plan view of the end portion of the heat exchanger, showing the electric pre-heating element in the end tank of the heat exchanger.

In the drawings, beginning with Figs. 1 and 2, the radiator 15 is air cooled by the fan 16, which is driven by the engine 17 in the usual way. The radiator has upper tank 18, cooling core 19, and lower reservoir tank 20. The upper tank has inlet 21; the lower tank has two outlets, 22 and 23 respectively.

The engine 17 drives the water pump 24, the suction end of which is connected to the radiator outlet 23 by pipe 25. The pump discharges into the engine cooling channel 26 which jackets the cylinder block and the cylinder head (see Figs. 9, 10, 11, and 12). This cooling channel discharges into the top flow control 27 (Fig. 5), comprising the jet pump 28 and the thermostat valve 29 combined in unitary form.

The top flow control 27 of Fig. 1 is substantially the same functionally as the "flow inducer" illustrated and described in the aforesaid patent.

In top flow control 27, the jet pump 28 has the usual nozzle 28a discharging into a constricted passage forming the venturi, and surrounded by the usual vacuum chamber which has a flow opening 30. The thermostat valve 29 opens into the pipe 31 which connects the top flow control 27 with the upper tank 18 of the radiator at inlet 21. Passage of liquid from the cylinder jacket 26 to the radiator 15 is accordingly controlled by the temperature of the liquid that is discharged from the nozzle 28a.

Suspended from the crank case of the engine 17 in the customary manner is the oil pan 32 which serves as the reservoir for the lubricating oil. The oil pump 33 which is driven by the engine is connected at its suction inlet by the pipe 34 to the oil screen 35. The pump forces oil at high pressure through pipe 36 into the oil passages of the engine. Screen 35 is disposed below the level of the oil in pan 32.

The heat exchanger 37, through which the circulating water flows, is disposed in the oil pan 32 and immersed in the oil therein. The exchanger consists of a pair of end tanks connected by a group of parallel tubes 38. One end of tank 39 has a single compartment. The other tank has two compartments, 40 and 41 respectively, so that water entering one compartment flows through one-half of tubes 38 into the end tank 39 and then through the other half of said tubes into the other compartment, as indicated by the diagrams, Figs. 9, 10, 11, and 12.

The heat exchanger is connected by piping to the top flow control 27, to the lower tank 20 of the radiator 15, and to the water pump 24 in the following manner:

Compartment 40 of the heat exchanger is connected to the top flow control 27 by pipe 42, which leads from an outlet of the compartment to the vacuum chamber of the jet pump 28 at its flow opening 30.

Compartment 41 has two outlets, 43 and 44 respectively. Outlet 43 is connected by pipe 45 to the radiator outlet 22. Outlet 44 is connected by pipe 46 to T 47 in the suction pipe 25 of the water pump 24.

Figure 7:
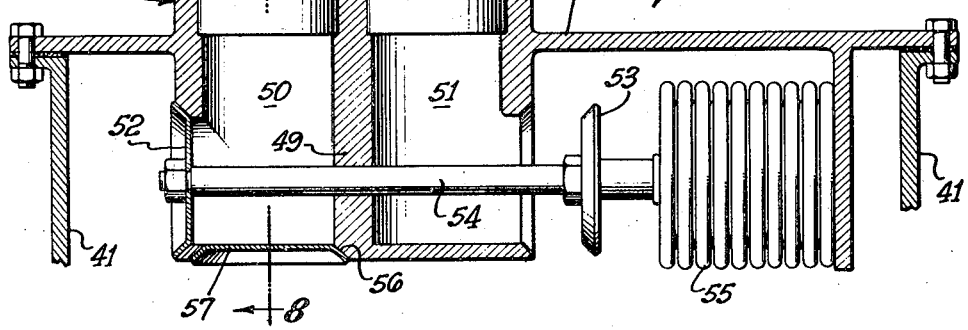
Fig. 7 is a plan view, in part section, of the regulating valve.
Figure 8:
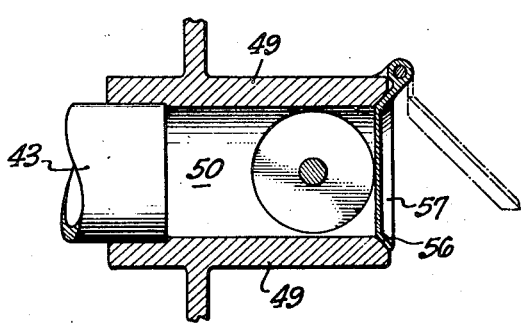
Fig. 8 is a vertical section on the line 8—8 of Fig. 7.

Compartment 41 of the heat exchanger contains the automatic regulating valve 48 (shown in more detail by Figs. 7 and 8). The valve is entirely immersed in the water in the compartment, and regulates the flow of the circulating water through outlets 43 and 44.

As will be hereinafter described in detail, this regulating valve operates automatically to control and selectively to direct the flow of both hot and cold water from and to the cylinder jacket 26, the heat exchanger 37, and the lower tank 20, sometimes in a single stream, sometimes in two streams, and at times in three streams. Whenever the plural streams flow, the regulating valve serves as a mixing chamber for the hot and cold coolants. The regulating valve is responsive to the temperatures and to the pressure and direction of flow of the liquid passing through it.

As shown in Figs. 7 and 8, the regulating valve 48 has the valve body 49, containing the two valve chambers 50 and 51. These chambers communicate with the outlets 43 and 44 respectively, and are integral extensions of the valve body. The valve has two gates 52 and 53 mounted on a common stem 54 and moved in either direction of the stem axis by the thermostat 55. This thermostat may be in the form of a bellows, which expands upon an increase in temperature. This bellows, being subjected to the temperature of the water in compartment 41 of the heat exchanger 37, thus expands and contracts in accordance with a rise or lowering of the temperature in this compartment. This change in the bellows serves to adjust the relative positions of the gates or closures 52, 53 with respect to their seats formed on the valve chamber 50, 51.

In the position shown in Fig. 7, the thermostat 55 is contracted, and gate 52 is seated while gate 53 is off its seat. Accordingly, the water in heat exchanger 37 is in communication only with outlet 44 and pipe 46 to T 47, and thence to the inlet of pump 24. As bellows 55 expands, gate 52 moves farther from its seat, and gate 53 moves closer to its seat. At an intermediate position of the thermostat 55, the water in heat exchanger 37 is then in communication with both conduits 46 and 45. Ultimately, when gate 53 closes, communication exists only with outlet 43 and pipe 45.

The valve chamber 50 has a second valve seat 56 and the by-pass flap valve 57 for by-passing valve 52. The by-pass valve 57 is closed by the pressure of the water flowing from the heat exchanger tubes 38 into the compartment 41, but valve 57 opens automatically by water pressure in the reverse direction when the water flows from the lower tank of the radiator through pipe 45 and outlet-inlet 43 into compartment 41 and through the heat exchanger. The purpose of this arrangement will be described hereinafter.

The valve body 49 and the thermostat 55 are secured to the cover plate 58, the valve body and cover plate being integral. The cover plate forms the enclosing end of compartment 41, being secured fluid-tight thereto in any suitable manner. The cover plate projects through a suitable opening in the end of the oil pan, the heat exchanger being secured fluid-tight to the oil pan by welding so that no leakage of the oil or the water may occur.

Figs. 9, 10, 11, and 12 illustrate the progressive stages of operation of the heat exchange system as the temperature of the jacket water increases.

During the cycles of Figs. 9, 10, and 11, the thermostat 29 of the top flow control 27 remains closed, this thermostat being set to open at a somewhat higher temperature than the thermostat 55 of the regulating valve 48.

Fig. 9 indicates conditions existing at a cold start, and during certain running conditions, such as descending long grades even in warm weather, and also during normal running with moderate load during cold winter conditions. In such operations, the entire radiator 15 is by-passed and therefore inactive, so that the water temperature in the lower tank is at or approaches that of the atmosphere.

The regulating valve 48 is in the position indicated in Fig. 7. The passage of water to conduit 45 is prevented by closure of the gate 52. However, water can circulate through a "short channel," as indicated by the arrows. The thermostatic valve 29 being closed, accordingly water from the water jacket 26 flows downwardly through coupling 30 from the nozzle 28a of jet pump 28 through pipe 42, heat exchanger 37, valve chamber 51, pipe 46, water pump 24, back to the water jacket 26.

In this short single flow path which may be termed the "heating cycle," nearly all of the heat of fuel combustion absorbed by the cylinder jacket 26 is usefully employed, and the least amount of heat is wasted, since none of it passes into the radiator. By aid of heat exchanger 37 there is heat interchange between the circulating water and the lubricating oil in the oil reservoir 32. During cold start, heat passes from the jacket water to the oil. During certain of the other running conditions, the heat transfer may be from the oil to the water. This heating cycle flow continues until the temperature of the circulating water causes thermostat bellows 55 to expand.

When valve gate 52 is opened in response to the temperature rise in the tank 41, both valve chambers 50 and 51 are in communication with the water issuing from the heat exchanger 37. This is represented in Fig. 10.

In this position, which may be deemed the first intermediate running cycle, the hot circulating water discharged from the jet pump 28 passes, as before, through the heat exchanger 37 further to heat interchange with the lubricant. The regulating valve 48, however, permits water to flow in two streams, one to the inlet of pump 24, the other through the lower tank 20 of the radiator 15, by way of the outlets 22 and 23, via pipe 25 to the inlet of pump 24. Thus, three streams of water pass through the regulating valve 48.

The path through the heat exchanger 37 and pipe 46 utilizes water that is very hot. The path through the lower tank 20 gives up some of its heat in the lower tank, the heated water rising by convection into the cooling core where it is rapidly cooled. Accordingly, the two streams (one hot, the other cold), joining at the inlet to the water pump 24, enter into the inlet side of the water jacket 26 as a single stream, and at a somewhat reduced temperature.

Fig. 11 illustrates a still further stage, which may be termed the second intermediate running cycle in the operation of the system. This represents the flow when the thermostat 55 of Fig. 7 is fully expanded and closure 53 is seated and closure 52 unseated. All of the circulating water now flows through a single channel from the outlet of ejector pump 28 through heat exchanger 37, lower tank 20, pump 24, to the water jacket 26. The hot water entering the lower tank rises upwardly in the radiator 15 and is subjected to forced cooling.

The intake of cooled water from the lower tank 20 may result in substantially lowering the temperature to which thermostat bellows 55 is subjected. In that case, communication will be re-established to pipe 46; and the opening and closing of gate 53 may be expected to take place cyclically during the operation.

The regulating valve 48 therefore causes the hot water from the heat exchanger 37 and the cold water from the lower tank to flow in the correct proportions to the water pump 24. Accordingly, the water enters the water jacket 26 at a temperature suited to maintain the desired engine temperature. During this cycle, the loss of heat to the radiator is somewhat greater than for Fig. 10.

Fig. 12 represents the cooling cycle. The imposition of a heavy load, or the occurrence of other operating factors, may cause the water in the water jacket 26 to attain high temperatures, sufficient to cause the thermostatic valve 29 of top flow control valve to open. This condition is illustrated in Fig. 12. Therein the cooling core 19 and upper tank 18 of radiator 15 are utilized. The water discharges from the jacket 26 through nozzle 28a of the jet pump 28, and now is free to pass into the pipe 31 and to the upper tank 18. The resultant suction and vacuum of the jet pump reverses the flow of water through the heat exchanger 37, as indicated by the arrows.

Water discharging into the upper tank 18 flows downwardly and is cooled in its progress to the lower tank 20. From the lower tank cold water flows through outlets 22 and 23 in two parallel paths to the pump 24 and to the regulating valve 48 due to the suction of pump 24 supplemented by the suction of jet pump 28. The two paths include pipes 25, 45, and 46. A third path includes the regulating valve 48, heat exchanger 37, pipe 42, to the suction side of the jet pump 28. In this hot stage of operation, the valve member 51 (Fig. 7) connected to pipe 46, is closed by gate 53. This path serves to pass cooling water to the heat exchanger 37 for cooling the oil in pan 32.

The impact of the cold radiator water passing through pipe 45 may temporarily cool the thermostat 55. This thermostat would contract and move the gates 52 and 53 to open communication to chamber 51 and to close communication to chamber 50, thereby interrupting the flow through the heat exchanger 37. However, the vacuum or suction action of the water pump 24 and the jet pump 28 on the flap valve 57 and the reversed water flow through pipe 45 and chamber 50 will urge the flap valve 57 to the open position indicated in dotted lines in Fig. 8. In this way the flow of cold radiator water through the valve 48 and the heat exchanger 37 is maintained.

The double path circulation of Fig. 12 continues until the temperature of the water at the valve 29 is reduced sufficiently to cause valve 29 to close. When this occurs, the flow illustrated in Fig. 11 is re-established, reversing the flow of the water through the heat exchanger 37.

As proved by tests, the cooling action of the cycle of Fig. 12 is so effective that the decrease of the temperatures of the jacket water and the lubricating oil would quickly restore the operation to that of Fig. 11, so that the cooling cycle of Fig. 12 would be utilized briefly and intermittently and would not be required for prolonged periods.

As required by the temperature of the water in the water jacket 26, the system may assume any of the positions of Figs. 10, 11, and 12. The radiator water is kept as cold as practicable, and this cold water is drawn upon only as needed to reduce the temperature of the jacket water. This is done, for the most part, by circulating the water to by-pass the entire radiator (Fig. 9) or to by-pass the cooling core and the upper tank (Figs. 10 and 11). In the latter case, part or all of the hot circulating water from the jacket 26 and the heat exchanger 37 flows through the lower tank 20, where it is cooled.

Where road clearances and other space limitations prevent placing the heat exchanger in the bottom of the oil pan in the manner shown by Figs. 1 and 2, the oil pan may be broadened to provide either one or two side compartments or chambers for containing the heat exchanger.

One such arrangement is shown by Figs. 3 and 4, in which a single compartment or box 59 is secured fluid-tight to a side of the oil pan 32, the said side serving as the partition 60 between the oil pan and the box. The box 59 contains, in fluid-tight manner, the heat exchanger 61 and the regulating valve 48.

The heat exchanger 61 has the end tanks 62 and 63, the latter being partitioned to form the two compartments 64 and 65 which are connected to end tank 62 by the tubes 66 in the manner described for heat exchanger 37 of Figs. 1 and 2. The tubes 66 pass through the deflectors 67 for a purpose subsequently described herein. The compartment 64 has an outlet for receiving pipe 42, which connects to the top flow control 27, as described for Figs. 1 and 2. The compartment 65 contains the regulating valve 48, the outlets 43 and 44 thereof receiving the pipes 45 and 46 respectively, which connect with the lower tank of the radiator and the suction line of the water pump, as previously described.

The oil suction pipe 34 of Fig. 1 is omitted. Instead, a pipe 68 leads from the screen 35 into the box 59, passing through a suitable opening in the partition 60 near to the end tank 62 of the heat exchanger. Another pipe 69 leads from box 59 near the end tank 63, passing through the partition 60 and connecting to the suction inlet of oil pump 33.

It is apparent that, in response to the suction vacuum of the oil pump, the oil will flow with moderate velocity from screen 35 through pipe 68 into box 59, and then at slower flow rate through the heat exchanger. The deflectors 67 will cause the oil to flow from side to side and lengthwise of the heat exchanger 61 (as indicated by the arrows), the oil passing in multiple streams through the spaces between the tubes 66. The pump suction draws the oil from box 59 through pipe 69 into the suction inlet of oil pump 33, the pump forcing the oil by positive pressure through the tube 36 to the lubricating passages of the engine.

The box 59, with the contained heat exchanger 61 and regulating valve 48, may be mounted and secured to the engine separately and apart from, but connected to, the oil pan by the pipe 68. The position of box 59 must be such that the open ends of pipes 68 and 69 are always submerged in the oil in the box.

It is manifest that the arrangement shown by Figs. 3 and 4 may be simplified by omitting the pipe 68 and a portion of the oil screen 35. This may be done by enlarging the opening indicated for pipe 68 and removing the screen mesh from the oil screen 35 and placing the mesh in the enlarged opening.

Figure 6:
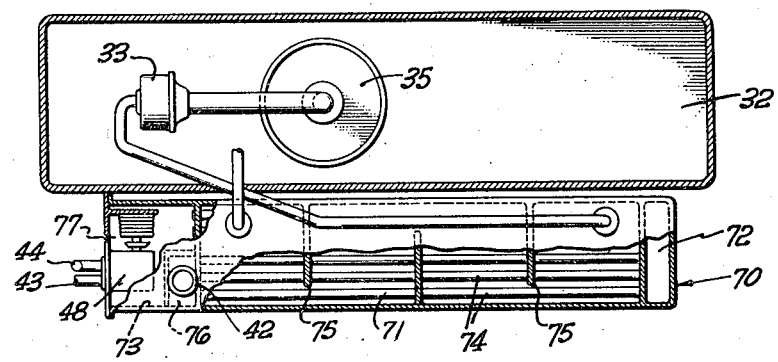
Fig. 6 is a plan view in part section, showing the high pressure type of heat exchanger and the regulating valve combined in unitary form.

Fig. 6 shows a boxed heat exchanger which may be placed at any angle with respect to the engine and at a moderate distance therefrom. This arrangement is desirable and, in some instances, necessary for vehicles which operate at steep angles from the horizontal and for airplanes which fly at all angles, including upside down.

Thus, the box 70 contains and fully encloses the heat exchanger 71 and the regulating valve 48. The heat exchanger 71 and the portion of the box containing it are subject to the maximum positive pressure of the oil pump 33; otherwise, the heat exchanger is the same as that in box 59 of Fig. 4.

The heat exchanger has the end tanks 72 and 73, which are connected together by tubes 74, the latter passing through the deflectors 75. The end tank has two compartments 76 and 77, compartment 76 having an outlet for receiving pipe 42, which connects to top flow control 27. Compartment 77 contains the regulating valve 48, having the outlets 43 and 44 which receive the pipes 45 and 46 respectively for connecting with the lower tank of the radiator and the suction pipe 25 of the oil pump, as previously described.

Where space limitations or other reasons do not permit incorporating the regulating valve 48 into the end tank of the heat exchanger, the regulating valve 48a may be mounted outside the crank case, as shown in Fig. 13.

The valve 48a is enclosed within an outer shell 78 which is connected by a pipe 79 to the end compartment 80 of the heat exchanger 81. The valve and its shell have the water outlets 43a and 44a. The regulating valve 48a otherwise is the same as regulating valve 48. Also, the heat exchanger 81 otherwise may be the same and have the same water and oil piping connections as any of the other heat exchangers herein described.

In the present invention, the operation and functioning of the top flow control 27, including thermostat valve 29 and the regulating valve 48, are mutually dependent one upon the other. The link between the two is the circulating water passing through both, the motivating factors being the water temperatures at the top flow control 27 and the regulating valve 48, and the positive and negative pressures of the circulating water in the regulating valve.

Thus as previously shown herein, the by-pass valve member 57 of the regulating valve 48 is opened and closed merely by the pressure of the circulating water in accordance with the direction of said pressure.

However, for heavy equipment, for vehicles operating at steep angles, as tractors, airplanes, and including the motorized transport and fighting equipment for the armed forces, it may be desirable or necessary to augment the aforesaid simple circulating water link by additional forces. Figs. 14 and 15 show a pressure-vacuum means and a temperature means co-operating with electric means for controlling and operating the by-pass valve member of the regulating valve. These constitute two methods, which may be combined or which may be optionally alternative for the desired purpose.

In Figs. 14 and 15, the top flow control 82 comprises the jet pump 83, and the thermostat 84 which is connected to the valve 85 which controls the outlet 85a by a snap over linkage. The jet pump has the usual nozzle and the vacuum chamber 86, the latter having the outlet 87 for receiving the pipe 42.

Projecting from the vacuum chamber 86 is the pressure-vacuum cylinder 88, one end of which is closed by the telescoping cap 89 which is threaded into the cylinder. The telescoping cap contains a flexible diaphragm 90 having a stem, on the end of which is the electric switch bar 91. The switch bar is movable axially in the telescopic cap 89 by the diaphragm 90 for the purpose of closing or opening the switch contacts 92, one of the two contacts being grounded through the metal of the jet pump. The telescopic cap 89 has a suitable vent hole to atmosphere, so as to permit unrestrained movement of the diaphragm. The live contact 92 is connected by the wire 93 to a conventional solenoid magnet 94 which is electrically connected by the wire 95 to a terminal of the battery 96, the other terminal of which is grounded.

The regulating valve 48b has the by-pass valve 97 operable by the lever 98, and to which the plunger of the solenoid magnet 94 is linked.

When the flow control valve 85 is closed, the pressure of the circulating water in all parts of the jet pump is positive. The circulating stream flows therefrom via outlet 87 into pipe 42 through the heat exchanger 37, and into the regulating valve 48b, the positive pressure of the water urging the by-pass valve 85 to closure.

Also, the positive pressure in the vacuum chamber 86 and the cylinder 88 moves the diaphragm 90 and the switch bar 91 in the direction away from the switch contacts 92 so that the solenoid magnet 94 is de-energized, and the by-pass valve 97 remaining closed and held so by the plunger and usual spring in the conventional solenoid magnet.

On the other hand, when the top flow control valve 85 is open, the functioning of the jet pump 83 establishes vacuum or negative pressure in the vacuum chamber 86, so that the water now flows in the reverse direction into the regulating valve 48b, the heat exchanger 37, the pipe 42, and through outlet-inlet 87 into the vacuum chamber 86 of the jet pump. Thus, the by-pass valve 97 is urged into open position.

At the same time, the diaphragm 90 and the switch bar 91 are moved by the negative pressure in the direction to close the switch contacts 82, thereby energizing the solenoid magnet 94 which pulls and holds the by-pass valve 97 in open position.

In the top flow control 27 of Figs. 1 and 5, the opening and closing of the valve 29 is rather gradual, due to the functioning of the thermostat. This is quite satisfactory for many services, but certain other services require preferably quick, snappy opening and closing of the valve. Figs. 14 and 15 show the top flow control 82 in which the thermostat 84 and the valve closure 85 are connected by a snap-over linkage, the combination accomplishing the desired quick, snappy valve action. This linkage may be substantially the same as illustrated and described in detail in U. S. Patent No. 2,286,485 issued to this applicant on June 16, 1942.

The snap over linkage comprises mainly the rock shaft 100, the bell crank lever 101, the snap over lever 102, and the snap over spring 103. The bell crank and the snap over lever are mounted on the rock shaft, all three having limited rotative movement on their common axis through a definite angle, established by mutually intercepting jaws or dogs on each of the three. The snap over spring 103 is linked at one end to the snap over lever 102, the other end of the spring being secured to an anchor 104 located below the common axis of the rock shaft and lever.

The rock shaft 100 is firmly secured to the top flow control valve 85 so that the valve is opened and closed by the limited forward and reverse rotation by the rock shaft. One arm of the bell crank 101 is linked to the movable end of the thermostat 84. During operation when the water circulating through the top flow control 82 attains a predetermined hot temperature, the resultant expansion of the thermostat 84 causes the bell crank 101 to begin rotative movement, the engaging interceptors causing the snapover lever 102 likewise to rotate. When the snapover lever 102 reaches dead center with respect to the snapover spring 103, the interceptors of the snapover lever and the rock shaft reach engagement; therefore, continued expansion of the thermostat 84, acting upon the bell crank 101, causes the snapover lever 102 to move ahead past dead center, whereupon the snapover spring 103 pulls the lever ahead rapidly, carrying with it the rock shaft 100 which, with like rapidity, rotates the valve 85 from its closed position to full open position.

The other arm of the bell crank 101 is shown connected by the spring 99 to an adjusting screw 99a. These three provide means for adjusting the setting of thermostat 84, as for the hot and the cold seasons. They may be omitted where such adjustment is not desired.

Fig. 15 shows that the opening and closing movement of the valve 85 may be utilized to operate by-pass valve member 97 of the regulating valve. On the end of the shaft 100 and rotatable therewith is the electric switch arm 106, which is adapted to close and open an electric circuit at switch contact 107. A wire 108, leading from the contact 107, may connect with the solenoid 94 which operates the by-pass valve member 97 of the regulating valve.

Manifestly, this may be done not only with the snapover mechanism, but also without it. In the latter case, the snapover lever and spring and the intercepting jaws or dogs would be omitted. The bell crank 104 would be firmly secured to the rock shaft 105, so that rotative movement of the bell crank and shaft by the thermostat 88 would directly rotate the valve 89 into open or closed position.

Wherever the climatic conditions are such that the engine lubricant has fluidity during the cold season of the year, the temperature control system described will take care of the rapid heating of the water, the oil, and the engine, without resorting to preheating means.

But, where cold weather conditions demand preheating the engine before starting it, the system of the present invention provides a logical and effective means for transmitting heat from an external source to the water, the oil, and the engine interior, while the engine is at a standstill.

Fig. 16 shows a conventional type of electric preheating unit 109 secured into the end tank 39 of the heat exchanger 37. The wires 110 which lead from the preheating unit may terminate in a suitable receptacle 111 which may be located in any convenient place at or near the engine 17, the receptacle being adapted to receive a plug 112 which is energized by a suitable electric circuit. A similar preheating unit of suitable shape may be secured into the corresponding end tank of any of the heat exchangers herein described.

The inventor claims:

1. In a heat exchange system using a circulating liquid for controlling temperature, and including a liquid container in which heat is transferred to the liquid, said container having an inlet and an outlet: a liquid cooler having a space for collecting the cooled liquid; a controllable connection between the inlet side of the cooler and the outlet side of the container; a heat exchanger through which at least some of the liquid passes; means forming a connection between the said space and the inlet of the container; means connecting one end of the heat exchanger to the outlet of said container; thermal responsive means for connecting the other end of the heat exchanger with said space; and means for causing the flow of liquid to be in a direction from the heat exchanger to the inlet side of the cooler, or from the container to the heat exchanger.

2. In a heat exchange system using a circulating liquid for controlling temperature, and including a liquid container in which heat is transferred to the liquid, said container having an inlet and an outlet: a liquid cooler having a space for collecting the cooled liquid; a controllable connection between the inlet side of the cooler and the outlet side of the container; a heat exchanger through which at least some of the liquid passes; means forming a connection between the said space and the inlet of the container; means connecting one end of the heat exchanger to the outlet of said container; thermal responsive means for connecting the other end of the heat exchanger with said space, responsive to the temperature adjacent the outlet of the container; and means for causing the flow of liquid to be in a direction from the heat exchanger to the inlet side of the cooler, or from the container to the heat exchanger.

3. In a heat exchange system using a circulating liquid for controlling temperature, and including a liquid jacket through which the liquid passes and in which heat is transferred to the liquid, said jacket having an inlet and an outlet: a cooling radiator for the liquid, having a reservoir for collecting the cooled liquid; a heat exchanger through which at least some of the liquid passes; means forming a common passage between the inlet of the jacket and both the reservoir and one end of the heat exchanger; and means for controlling the relative amounts of flow to said common passage, and responsive to the temperature of the liquid adjacent the heat exchanger.

4. In a heat exchange system using a circulating liquid for controlling temperature, and including a liquid jacket through which the liquid passes and in which heat is transferred to the liquid, said jacket having an inlet and an outlet: a cooling radiator for the liquid, having a reservoir for collecting the cooled liquid; a heat exchanger through which at least some of the liquid passes; means forming a connection between the reservoir and the inlet of the jacket; a valve structure having a first valve closure controlling the flow of the liquid between the reservoir and the heat exchanger, and a second valve closure controlling the flow of fluid between one end of the heat exchanger and the inlet of the jacket; a flow controller adjacent the outlet of the jacket, controlling the flow of liquid to the cooling radiator; means connecting the other end of the heat exchanger with the outlet of the jacket; means for controlling said first and second valve closures and responsive to the temperature of the liquid adjacent the heat exchanger, and so arranged that, at temperatures below a minimum, the first valve is closed and the second valve is open; and, as the temperature increases, the first valve gradually opens and the second valve gradually closes; means responsive to the temperature of the liquid adjacent the outlet of the jacket for controlling said flow controller to cause it to open at a temperature higher than the temperature required to close the second valve closure; and means causing a flow of fluid from the heat exchanger to the outlet of the jacket when the flow controller is opened.

5. In a system for controlling the operating temperature of an internal combustion engine having a water jacket, as well as a container to which oil from the engine may flow: a radiator having a lower tank in which cooled liquid may collect, as well as an upper tank; a connection between the upper tank and the outlet of the water jacket; a heat exchanger in the oil container, through which heat exchanger at least some of the water passes; a connection between the lower tank and the inlet of the water jacket; means connecting one end of the heat exchanger to the outlet of the water jacket; thermal responsive means for connecting the other end of the heat exchanger with the lower tank; and means for causing the flow of water to be in a direction from the heat exchanger to the upper tank, or from the outlet of the water jacket to the heat exchanger.

6. In a system for controlling the operating temperature of an internal combustion engine having a water jacket, as well as a container to which oil from the engine may flow: a radiator having a lower tank in which cooled liquid may collect, as well as an upper tank; a connection between the upper tank and the outlet of the water jacket; a heat exchanger in the oil container, through which heat exchanger at least some of the water passes; a connection between the lower tank and the inlet of the water jacket; means connecting one end of the heat exchanger to the outlet of the water jacket; thermal responsive means for connecting the other end of the heat exchanger with the lower tank; and means responsive to the temperature adjacent the outlet of the water jacket for causing the flow of water to be in a direction from the heat exchanger to the upper tank, or from the outlet of the water jacket to the heat exchanger.

7. In a system for controlling the operating temperature of an internal combustion engine having a water jacket, as well as a container to which oil from the engine may flow: a radiator having an upper tank and a lower tank; a heat exchanger in the oil container; means forming a common passage between the inlet of the jacket and both the lower tank and the heat exchanger; and means for controlling the relative amounts of flow to said common connection and responsive to the temperature of the water adjacent the heat exchanger.

8. In a heat exchange system using a circulating liquid for controlling temperature, and including a liquid jacket through which the liquid passes and in which heat is transferred to the liquid, said jacket having an inlet and an outlet; a cooling radiator for the liquid, having a reservoir for collecting the cooled liquid; a heat exchanger through which at least some of the liquid passes; means forming a common passage between the inlet of the jacket and both the reservoir and one end of the heat exchanger; means for controlling the relative amounts of flow to said common connection, and responsive to the temperature of the liquid adjacent the heat exchanger; connections between the other end of the heat exchanger to the outlet of the jacket and from the outlet of the jacket to the inlet of the radiator; temperature responsive means for controlling the passage of liquid from the outlet of the jacket either to the heat exchanger or to the inlet of the radiator; and means for inducing flow from the heat exchanger to the radiator in response to the flow of liquid from the outlet of the water jacket to the radiator.

9. In a heat exchange system using a circulating liquid for controlling temperature, and including a liquid container in which heat is transferred to the liquid, said container having an inlet and an outlet: a liquid cooler having a space for collecting the cooled liquid; a controllable connection between the inlet side of the cooler and the outlet of the container; a heat exchanger through which at least some of the liquid passes; means forming a connection between the said space and the inlet of the container; means connecting one end of the heat exchanger to the outlet of said container; thermal responsive means for connecting the other end of the heat exchanger with said space; means for causing the flow of liquid to be in a direction from the heat exchanger to the inlet side of the cooler, or from the container to the heat exchanger, said alteration in the direction serving to reverse the flow between the space and the heat exchanger; and supplemental valve means, effective to pass liquid only from the space to the heat exchanger.

10. In a heat exchange system using a circulating liquid and including a liquid container in which heat is transferred to the liquid, as well as a heat exchanger through which at least some of the liquid passes: a cooler having a space for collecting cooled liquid, said cooler being adapted to receive warmed liquid from the container and to transmit cooled liquid from said space to the container; connections associated with the heat exchanger for conducting liquid between the cooler and the heat exchanger, and between the heat exchanger and the outlet of the container; valved means controlling the flow of liquid from the container to the cooler; means operative when said flow occurs to induce flow from the heat exchanger past the valved means, thereby reversing the flow through the heat exchanger; valved means for controlling the flow from the heat exchanger to the space; and supplemental means effective to pass liquid only from the space to the heat exchanger.

11. In a heat exchange system using a circulating liquid and including a liquid container in which heat is transferred to the liquid, as well as a heat exchanger through which at least some of the liquid passes: a cooler having a space for collecting cooled liquid, said cooler being adapted to receive warmed liquid from the container and to transmit cooled liquid from said space to the container; connections associated with the heat exchanger for conducting liquid between the cooler and the heat exchanger, and between the heat exchanger and the outlet of the container; valved means controlling the flow of liquid from the container to the cooler; means operative when said flow occurs to induce flow from the heat exchanger past the valved means, thereby reversing the flow through the heat exchanger; valved means for controlling the flow from the heat exchanger to the space; and supplemental means effective to pass liquid only from the space to the heat exchanger including an electrically operated device and a circuit controller for said device and operated in accordance with the position of said valved means.

12. In a system for controlling the operating temperature of an internal combustion engine having a water jacket as well as a container to which oil from the engine may flow: a radiator having a lower tank; a heat exchanger in the oil container; passage forming means adapted to connect the inlet of said jacket with said lower tank as well as with the heat exchanger; and means controlling the relative amounts of flow to said jacket from the lower tank and the heat exchanger in accordance with the temperature of the water adjacent the heat exchanger.

13. In a system for controlling the operating temperature of an internal combustion engine having a water jacket through which water may circulate: a radiator having a lower tank; conduit means in circulatory relationship with the water jacket; passage forming means adapted to connect the inlet of said jacket with said lower tank as well as with the conduit means; and means controlling the relative amounts of flow to said jacket from the lower tank and the conduit means in accordance with the temperature of the water at a point in the circulation of the water.

14. In a system for controlling the operating temperature of an internal combustion engine having a water jacket as well as a container to which oil from the engine may flow: a radiator having an upper tank and a lower tank; a heat exchanger in the oil container; passage forming means adapted to connect the inlet of said jacket with said lower tank, as well as with the heat exchanger; means controlling the flow to said jacket in accordance with the temperature of the water adjacent the heat exchanger; means for passing water from one of said passages to said upper tank; and a supplemental valve operating independently of said temperature to control said means.

15. In a system for controlling the operating temperature of an internal combustion engine having a water jacket as well as a container to which oil from the engine may flow: a radiator having an upper tank and a lower tank, a heat exchanger in the oil container; control means responsive to the temperature of the water in said jacket for establishing communication between the outlet of said jacket and said upper tank; means connecting said outlet with the heat exchanger; passage forming means adapted to connect the inlet of said jacket with said lower tank as well as with the heat exchanger; means including valve mechanism responsive to the temperature of the water adjacent the heat exchanger for controlling said passages with respect to each other; said flow control means and said valve mechanism cooperating to control the direction of flow between the heat exchanger and said outlet in accordance with the engine temperature; and means operative upon establishment of communication by said flow control means for causing a flow in said connecting means.

16. In a system for controlling the operating temperature of an internal combustion engine having a water jacket as well as a container to which oil from the engine may flow: a radiator having an upper tank and a lower tank; a heat exchanger in the oil container; flow control means responsive to the temperature of the water in said jacket for establishing communication between the outlet of said jacket and said upper tank; means connecting said outlet with the heat exchanger; passage forming means adapted to connect the inlet of said jacket with said lower tank as well as with the heat exchanger; valve mechanism responsive to the temperature of the water adjacent the heat exchanger for controlling said passages and adapted to interrupt communication between said lower tank and said heat exchanger in response to a predetermined temperature of said water; said flow control means and said valve mechanism cooperating to control the direction of flow between the heat exchanger and said outlet in accordance with the engine temperature; means forming a one-way valve for ensuring flow in one direction between said tank and said heat exchanger when communication is interrupted by said valve mechanism; and means operative upon establishment of communication by said flow control means for causing a flow in said connecting means.

17. In a system for controlling the operating temperature of an internal combustion engine having a water jacket as well as a container to which oil from the engine may flow: a radiator having an upper tank and a lower tank; a heat exchanger in the oil container; flow control means responsive to the temperature of the water in said jacket for establishing communication between the outlet of said jacket and said upper tank; means connecting said outlet with the heat exchanger; passage forming means adapted to connect the inlet of said jacket with said lower tank as well as with the heat exchanger; valve mechanism responsive to the temperature of the water adjacent the heat exchanger for controlling said passages and adapted to interrupt communication between said lower tank and said heat exchanger in response to a predetermined temperature of said water; said flow control means and said valve mechanism cooperating to control the direction of flow between the heat exchanger and said outlet in accordance with the engine temperature; a supplemental valve for permitting flow between said tank and said heat exchanger when communication is interrupted by said valve mechanism; means operative upon establishment of communication by said flow control means for causing a flow in said connecting means; and means whereby said flow causing means controls said supplemental valve.

18. In a system for controlling the operating temperature of an internal combustion engine having a water jacket: a radiator having an upper tank and a lower tank; conduit means in circulating relationship to the water jacket; flow control means responsive to the temperature of the water at a point in the circulatory path for establishing communication between the outlet of said jacket and said upper tank; means connecting said outlet with the conduit means; passage forming means adapted to connect the inlet of said jacket with said lower tank, as well as with the conduit means; and valve means operating upon the operation of the temperature responsive means to control the flow through said conduit means.

19. In a thermostatic valve mechanism: means forming a pair of passages, there being a port for each passage by which said passages are adapted to be in communication with a common space; a closure member for each of said ports arranged for simultaneous movement in an opposite sense with respect to said ports, whereby when one port is fully open, the other port is closed; and temperature responsive means in said space for actuating said closure members, there being a supplemental valve for one of said passages, said valve maintaining fluid flow in one direction between said space and said one passage when the port connection with the passage is closed by its closure.

20. In a system for controlling the operating temperature of an internal combustion engine having a jacket through which water may circulate: a radiator having a cooling section and a cooled water tank; flow passage forming means providing flow channels to the jacket inlet from the jacket outlet and from the cooled water tank, said means including a pump; and thermal responsive valve means in said flow passage means for causing the circulating water to flow to the jacket inlet by-passing the entire radiator or to flow through the cooled water tank by-passing the cooling section responsive respectively to a low temperature and a high temperature of the jacket water.

21. In a system for controlling the operating temperature of an internal combustion engine having a jacket through which water may circulate: a radiator having a cooling section and a cooled tank, said tank having two flow openings; flow passage forming means providing flow channels to the jacket inlet from the jacket outlet and from said tank, said means including a water pump; and thermal responsive valve means controlling the flow through said channels and adapted to connect said jacket outlet to the jacket inlet of the circulating water to by-pass the entire radiator and flow to the jacket inlet, or to connect said jacket outlet and inlet respectively with said flow openings in accordance with variations of the temperature of the water in the jacket to cause at least part of said water to by-pass said cooling section and flow through the cooled water tank.

22. In a system for controlling the operating temperature of an internal combustion engine having a jacket through which water may circulate: a radiator having a hot water receptacle, a cooling section and a cooled water tank; a conduit and a thermal responsive valve for permitting flow from the jacket outlet to the hot water receptacle when the jacket water temperature exceeds a predetermined high temperature; means forming flow channels from the jacket outlet and from the cooled water tank to the jacket inlet, said means including a pump; and thermal responsive valve means for causing the circulating water to flow to the jacket by-passing the entire radiator, or to flow through the cooled water tank by-passing the cooling section in accordance with successively different temperatures lower than the aforesaid predetermined temperature of the jacket water, said valve means being adapted to cooperate with the first-mentioned valve to change said chamber by causing the circulating water to flow through the entire radiator to the jacket inlet.

23. A system, as defined in claim 22, including means connecting said two thermal valves for causing said change of circulation and said flow through the entire radiator.

24. In a system for controlling the operating temperature of an internal combustion engine having a jacket and a pump for circulating water through the jacket: a radiator having a hot water receptacle, a cooling section, and a cooled water tank; conduit means including a thermostatic valve for circulating the water from the jacket outlet directly to the jacket inlet by-passing the entire radiator, responsive to a low temperature of the jacket water, or through the entire radiator responsive to a high temperature of the jacket water; and thermal responsive valve means in said conduit means for causing the circulating water to by-pass the said cooling section and flow through the cooled water tank responsive to a temperature of the jacket water intermediate the aforesaid temperatures.

25. In a system for controlling the operating temperature of an internal combustion engine having a jacket through which water may circulate: a radiator having a hot water receptacle, a cooling section and a cooled water tank, said tank having two flow openings; a conduit and a thermostatic valve for permitting flow from the jacket outlet to the hot water receptacle when the jacket water temperature exceeds a predetermined high temperature; means forming flow channels from the jacket outlet and from the cooled water tank through a pump to the jacket inlet; and thermal responsive valve means for causing the circulating water from the jacket to flow to one of said flow openings into and through the cooled water tank and from the other flow opening to the pump, responsive to temperatures of the jacket water below the aforesaid predetermined high temperature, said thermal valve means being adapted to cooperate with the first valve upon flow of the water through said receptacle and the radiator by reversing the flow through one of said openings responsive to the pump suction, thereby to cause the circulating water to flow in two streams from the cooled water tank to the pump.

26. In a system for controlling the operating temperature of an internal combustion engine having a jacket through which water may circulate: a radiator having a hot water receptacle, a cooling section and a cooled water tank; flow passage means providing flow channels to the jacket inlet from the jacket outlet and from said tank, said means including a water pump; thermal responsive valve means in said flow passage means for causing the circulating water to bypass the hot water receptacle and flow through the cooled water tank to the jacket inlet responsive to a predetermined temperature of the water issuing from the jacket outlet; a conduit between the jacket outlet and the hot water receptacle; and a power actuated means having a member in said conduit thermally responsive to a temperature of the jacket water higher than the aforesaid predetermined temperature, said power means being connected to the first thermal responsive means for causing the aforesaid circulation to change and to flow through the entire radiator to the jacket inlet.

FREDERIC W. HILD.

REFERENCES CITED

The following references are of record in the file of this patent:

UNITED STATES PATENTS

| Number | Name | Date |
| --- | --- | --- |
| 1,357,598 | Thompson | Nov. 2, 1920 |
| 2,021,569 | Pasco | Nov. 29, 1935 |
| 1,848,989 | Anibal | Mar. 8, 1932 |
| 1,286,993 | Giesler | Dec. 10, 1918 |
| 1,490,971 | Giesler | Apr. 22, 1924 |